United States Patent
Gut et al.

(10) Patent No.: US 7,528,730 B2
(45) Date of Patent: May 5, 2009

(54) ACTIVE LANE ASSISTANT

(75) Inventors: Matthias Gut, Reutlingen (DE); Jurgen Trost, Grafenberg (DE)

(73) Assignee: Daimler AG, Stuttgart (DE)

( * ) Notice: Subject to any disclaimer, the term of this patent is extended or adjusted under 35 U.S.C. 154(b) by 167 days.

(21) Appl. No.: 10/590,947

(22) PCT Filed: Oct. 26, 2004

(86) PCT No.: PCT/EP2004/012055

§ 371 (c)(1), (2), (4) Date: Aug. 8, 2006

(87) PCT Pub. No.: WO2005/047045

PCT Pub. Date: May 26, 2005

(65) Prior Publication Data

US 2007/0219688 A1    Sep. 20, 2007

(30) Foreign Application Priority Data

Nov. 5, 2003    (DE)    ................... 103 51 654

(51) Int. Cl.
*B60Q 1/00*    (2006.01)
*G08B 23/00*    (2006.01)
*A01B 69/00*    (2006.01)
*B62D 5/00*    (2006.01)

(52) U.S. Cl. .................. 340/575; 340/963; 340/439; 340/576; 701/41; 180/404

(58) Field of Classification Search .............. 340/438, 340/439, 575, 576, 963; 701/41; 180/404
See application file for complete search history.

(56) References Cited

U.S. PATENT DOCUMENTS

| | | | |
|---|---|---|---|
| 4,594,583 A | | 6/1986 | Seko et al. |
| 5,057,834 A | * | 10/1991 | Nordstrom ................... 340/963 |
| 5,765,116 A | | 6/1998 | Wilson-Jones et al. |
| 5,925,082 A | | 7/1999 | Shimizu et al. |
| 6,087,943 A | | 7/2000 | Bailey |
| 6,097,286 A | | 8/2000 | Discenzo |
| 6,308,123 B1 | * | 10/2001 | Ikegaya et al. ................ 701/41 |
| 7,069,129 B2 | * | 6/2006 | Iwazaki et al. ................ 701/41 |
| 2002/0013647 A1 | * | 1/2002 | Kawazoe et al. .............. 701/41 |
| 2002/0040265 A1 | * | 4/2002 | Sadano et al. ................. 701/41 |
| 2004/0262063 A1 | * | 12/2004 | Kaufmann et al. ........... 180/169 |

FOREIGN PATENT DOCUMENTS

| | | |
|---|---|---|
| DE | 20 42 853 | 3/1972 |
| DE | 692 04 239 T2 | 2/1993 |
| DE | 44 80 341 A1 | 3/1996 |
| DE | 197 02 383 A1 | 8/1997 |
| EP | 0 640 903 A1 | 3/1995 |

* cited by examiner

*Primary Examiner*—Benjamin C Lee
*Assistant Examiner*—Jack Wang
(74) *Attorney, Agent, or Firm*—Fitch, Even, Tabin & Flannery; Norman N. Kunitz

(57) ABSTRACT

In a method for monitoring the condition of a vehicle driver, the markings (3) of the lane in which the vehicle is moving are detected and a direction of travel which the vehicle has to follow in order to stay in the lane is determined. In this case, the vehicle driver is assisted in staying in the lane by the steering wheel being automatically centered. If the vehicle exactly follows the determined direction of travel over a certain period of time, this is a sign that the vehicle driver is not actively steering the vehicle, and a warning signal is generated.

6 Claims, 1 Drawing Sheet

ACTIVE LANE ASSISTANT

CROSS REFERENCE TO RELATED APPLICATION

This application is the National Stage filing under 35 U.S.C. 371 of International Application No. PCT/EP2004/012055, filed Oct. 26, 2004, and claims priority of German Patent Application 103 51 654.9, filed Nov. 5, 2003, the subject matter of which in its entirety, is incorporated herein by reference

BACKGROUND OF THE INVENTION

The invention relates to a method for monitoring the condition of a vehicle driver, in which a vehicle's position in a lane is detected and monitored, a direction of travel is determined, the actual position in the lane is compared with the direction of travel which is determined, and the driver is assisted in maintaining the position in the lane.

A method of this type is disclosed in EP 0 640 903 A1.

More and more tasks are being taken away from the driver by auxiliary means such as distance-control systems, cruise-control arrangements and lane assistants. These systems are used with the aim of making road traffic safer. In particular, accidents caused by drivers not paying attention should be avoided. However, a large number of such systems may be subject to misuse. Since systems of this type do not ensure complete safety, care should be taken that the driver continues to assume responsibility for driving the vehicle in spite of these systems assisting him.

EP 0 640 903 A1 discloses a system for assisting a driver in which a video camera or the like is arranged on a vehicle. This video camera is used to identify the lane or carriageway markings on the road. An associated signal processor estimates the lateral position of the vehicle in relation to the carriageway markings. An electric motor which is connected to the steering system is used to introduce torque into the vehicle steering arrangement which either assists the steering torque produced by the driver or counteracts it. The signal processor is formed such that it assists the driver in maintaining the vehicle's position in the lane. As a result, a channel-like carriageway in which the vehicle has to be kept is simulated. In this case, the driver can disengage driver assistance by the vehicle by introducing a sufficiently large steering torque. In particular, provision is made, when the vehicle approaches a carriageway marking, for a warning signal to be emitted as a sign that the vehicle is not moving in a calculated direction of travel. This should startle the driver so that he returns to the correct position on the carriageway.

The object of the present invention is to provide a method which can be used to identify when a driver is no longer actively steering the vehicle.

SUMMARY OF THE INVENTION

According to the invention, this object is achieved by a method of the type mentioned in the introduction, in which a warning signal for the driver is generated when the calculated direction of travel exactly matches the actual position in the lane over a prespecified period of time.

When the vehicle travels exactly in the calculated direction of travel over a relatively long period of time, which can be prespecified at the factory, it can then be assumed that the driver has let go of the steering wheel or that he is no longer actively steering the vehicle. In this case, the driver is prompted by a warning signal to actively control the vehicle again. In the method according to the invention, provision may be made for the position of the lane markings on the carriageway to be visually detected. The position of these markings in relation to the vehicle and the current vehicle data, for example speed, can be used to determine where the vehicle has to be steered in order to stay in the lane. In the event of a deviation from this determined direction of travel, the driver is actively assisted in assuming the calculated direction of travel. However, this also means that the position of the vehicle is automatically kept in the prespecified direction of travel, for example in the middle of the lane, if the driver takes his hands off the steering wheel or is no longer actively steering the vehicle. This is also absolutely intentional if the driver falls asleep briefly or is not paying attention for some other reason. However, such a state is dangerous over a relatively long period of time. The driver therefore has to be prompted to actively steer the vehicle again.

In one refinement of the method, provision may be made for a visual and/or audible and/or haptic warning signal to be generated. In particular, the steering wheel may be made to vibrate. Provision may furthermore be made to slow down the vehicle. This is expedient particularly when the driver does not react to the warning signal.

In one particularly preferred variant of the method, provision may be made for a test signal, which depends on the driving situation, to be added to the calculated direction of travel, and for the warning signal to be emitted when the vehicle follows the test signal. On account of this measure, it is possible to establish whether the vehicle is steering automatically or whether the driver is steering the vehicle.

A deviation from the calculated direction of travel is advantageously determined, and the steering angle at which the steering wheel has to be steered to stay in the lane or to move into the lane is determined. The driver can be assisted in maintaining the direction of travel in an optimum manner on account of this data being determined.

In one development of the method, provision is made for a manual torque actuator to shift the zero position of the steering torque by the determined steering angle. The determined steering angle is passed on to the manual torque actuator as an offset. This manual torque actuator shifts the zero position of the steering torque by the transmitted angle. In this way, the steering wheel is automatically centered, with the steering wheel being pulled in the direction of the angle which is required to stay in the calculated lane and/or maintain the direction of travel. A manual torque actuator is used particularly in so-called "steer-by-wire" systems in which there is no mechanical connection between the wheels and the steering wheel. In order to give the driver the conventional feel of driving which he gets when the steering wheel is mechanically connected to the wheels, a torque which simulates cramping of the wheels is applied to the steering wheel. In this case, the set torque is zero when the wheels are straight and the steering wheel is in the center position. Provision may be made here for the manual torque to increase as the steering wheel is turned or to increase more than proportionally the further the steering wheel is deflected. Automatic centering prompts the driver to operate the steering wheel such that the vehicle maintains the prespecified or calculated direction of travel. The driver feels as though the vehicle is locked in the lane.

In one preferred variant of the method, driver assistance for staying in the lane (steering assistance) increases dynamically with the deviation from the calculated direction of travel. This means that centering increases dynamically the closer the vehicle gets to a lane marking.

Steering assistance is preferably slowly withdrawn when no lane or lane marking is identified. If a lane is no longer identified, the offset determined by the steering angle and the increased centering are slowly withdrawn. The fact that steering assistance is not suddenly dropped means that the driver is not startled and safe driving of the vehicle is ensured.

According to the invention, the object is also achieved by a condition-monitoring device comprising a lane-identification device, means for determining a direction of travel, a monitoring device for monitoring deviations from the direction of travel, and a warning device, in which the warning device can be activated when the monitoring device detects that a specific direction of travel matches an actual direction of travel over a prespecified period of time. In contrast to the prior art, the warning device can be activated when it is established that the vehicle is being kept in the lane only automatically, that is to say without any action on the part of the driver. The driver is therefore provided with a warning before the vehicle moves from this ideal lane and approaches a carriageway marking. If the driver is first warned when the vehicle is close to the lane marking, this may trigger an incorrect reaction in the driver and more than ever cause a collision with a vehicle traveling in an adjacent lane. The condition-monitoring device according to the invention therefore increases safety in road traffic.

In one preferred embodiment of the condition-monitoring device, a "steer-by-wire" system is provided. In this case, provision may be made for the vehicle's position to be detected by the lane-identification device. The deviation from a calculated direction of travel, which deviation is identified in the monitoring device, may be passed on to the "steer-by-wire" system via the vehicle's CAN bus. This "steer-by-wire" system can then use the information to determine the angle at which the steering wheel has to be steered in order to stay in the lane or return to the lane. There is no mechanical connection between the wheels and the steering wheel in a "steer-by-wire" system.

The angle determined by "steer-by-wire" systems can be passed on to a manual torque actuator as an offset. This manual torque actuator shifts the zero position of the steering torque by the transmitted angle. This constitutes automatic centering. Automatic centering pulls the steering wheel in the direction of the angle which is required to stay in the lane. The "steer-by-wire" system may be integrated in the monitoring device, or vice versa.

As an alternative, provision may be made for the manual torque actuator to add a torque to the torque exerted by the chassis when there is a mechanical connection between the steering wheel and the wheels, that is to say when a "steer-by-wire" system is not used.

BRIEF DESCRIPTION OF THE DRAWING

Exemplary embodiments of the invention are explained in greater detail with reference to the drawing, in which.

DETAILED DESCRIPTION OF THE INVENTION

Figure 1:
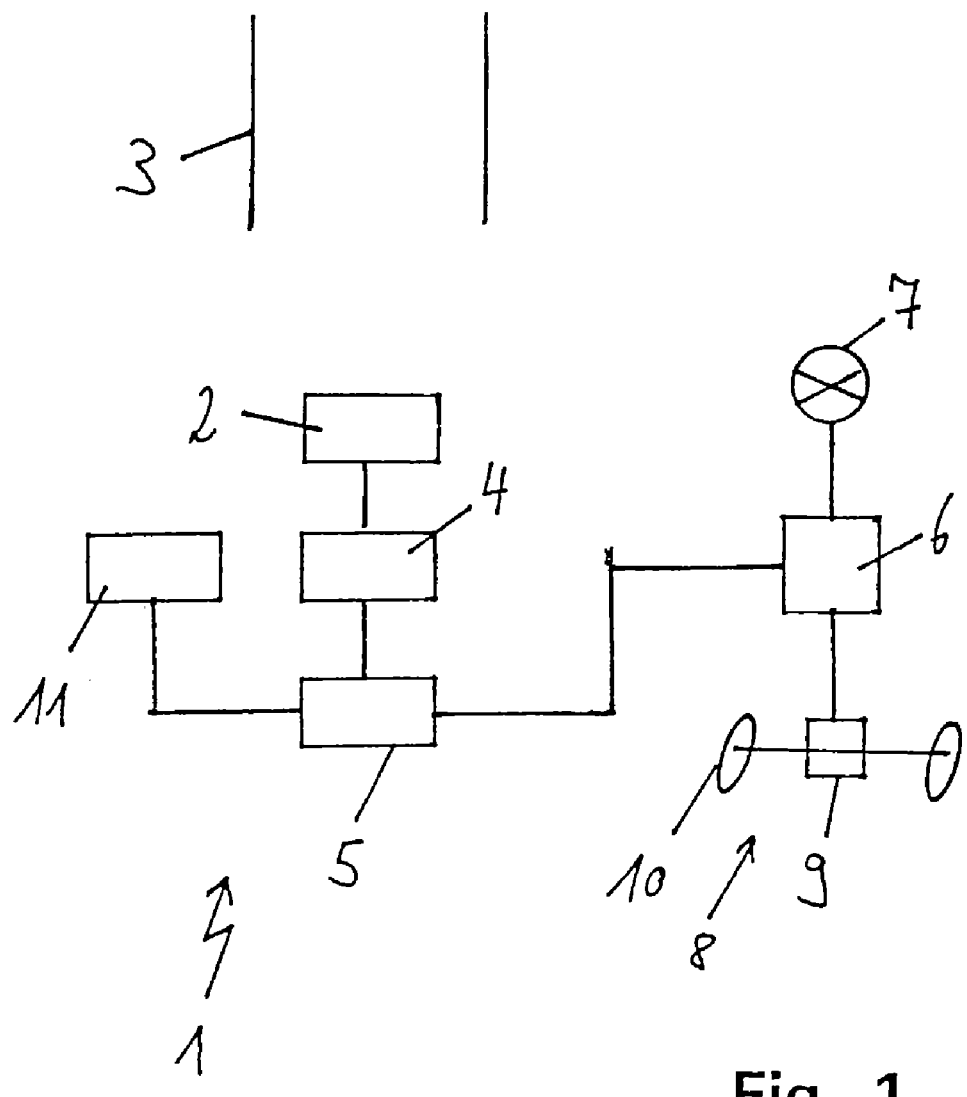
FIG. 1 schematically shows a condition-monitoring device.

FIG. 1 illustrates a condition-monitoring device 1 in a highly schematic manner. The position of the lane markings 3 is visually detected by a lane-identification device 2, which is also called a series lane assistant, by means of cameras, for example. The position of these lane markings 3 in relation to the vehicle and the current vehicle data are used to determine a direction of travel which the vehicle has to assume in order to stay between the lane markings 3. In this case, the intention may be for the vehicle to travel in the middle between the lane markings 3. However, depending on the course of the carriageway, it may also be moved toward one of the lane markings 3. A monitoring device 5 determines whether the vehicle deviates from the calculated direction of travel. The angle at which the steering wheel has to be steered in order to stay in the lane and/or maintain the calculated direction of travel is also determined. In the exemplary embodiment, the monitoring device 5 is part of a "steer-by-wire" system. The angle which is determined is transmitted to a manual torque actuator 6. This manual torque actuator shifts the zero position of the steering torque by the transmitted angle. This automatic centering pulls the steering wheel 7 in the direction of the angle which is required to stay in the lane. In order to amplify this effect, centering is dynamically increased. In the exemplary embodiment, the manual torque actuator 6 has a data-processing connection to the chassis 8. Instructions for controlling a motor 9 which actually adjusts the wheels 10 are determined from the position of the steering wheel 7 which is set by the driver. If the monitoring device 5 establishes that the vehicle is traveling exactly in the calculated direction of travel over a relatively long period of time, a warning device 11 is activated since it has to be assumed that the driver has let go of the steering wheel 7 or that he is no longer actively steering the vehicle.

In a method for monitoring the condition of a vehicle driver, the markings 3 of the lane in which the vehicle is moving are detected and a direction of travel which the vehicle has to follow in order to stay in the lane is determined. In this case, the vehicle driver is assisted in staying in the lane by the steering wheel being automatically centered. If the vehicle exactly follows the determined direction of travel over a certain period of time, this is a sign that the vehicle driver is not actively steering the vehicle, and a warning signal is generated.

The invention claimed is:

1. A method for monitoring the condition of a vehicle driver, comprising;
   detecting and monitoring a vehicle's position in a lane,
   calculating a desired direction of travel,
   comparing the actual position in the lane with the direction of travel which is calculated,
   assisting the driver in maintaining the position in the lane,
   generating a warning signal for the driver when the calculated direction of travel exactly matches the actual position in the lane over a pre-specified period of time,
   selectively adding a test signal, which depends on the driving situation, to the calculated direction of travel, and,
   emitting the warning signal if the vehicle follows the test signal.

2. The method as claimed in claim 1, further including generating at least one of a visual, an audible and a haptic warning signal.

3. The method as claimed in claim 1, further including determining a deviation from the calculated direction of travel, and determining the steering angle at which the steering wheel has to be steered to stay in the lane or to move into the lane.

4. The method as claimed in claim 3, further including utilizing a manual torque actuator to shift the zero position of the steering torque by the determined steering angle.

5. The method as claimed in claim 1, further including dynamically increasing driver assistance for staying in the lane with the deviation from the calculated direction of travel.

6. The method as claimed in claim 1, further including slowly withdrawing driver assistance for staying in the lane when no lane is identified.

* * * * *